US008775559B1

(12) United States Patent
Huntwork et al.

(10) Patent No.: US 8,775,559 B1
(45) Date of Patent: Jul. 8, 2014

(54) GENERATING NETWORK PAGES USING CUSTOMER-SUPPLIED GENERATION CODE

(75) Inventors: Andrew S. Huntwork, Seattle, WA (US); Jeremy Boynes, Mercer Island, WA (US); Pravi Garg, Seattle, WA (US); Prashant J. Thakare, Mercer Island, WA (US); Shashank Shekhar, Andhra Pradesh (IN)

(73) Assignee: Amazon Technologies, Inc., Reno, NV (US)

( * ) Notice: Subject to any disclaimer, the term of this patent is extended or adjusted under 35 U.S.C. 154(b) by 190 days.

(21) Appl. No.: 13/348,051

(22) Filed: Jan. 11, 2012

(51) Int. Cl.
*G06F 15/16* (2006.01)
*G06Q 30/00* (2012.01)
*G06F 21/53* (2013.01)
*H04L 29/06* (2006.01)

(52) U.S. Cl.
CPC ........ *G06F 21/53* (2013.01); *G06F 2221/2149* (2013.01); *H04L 63/10* (2013.01); *H04L 63/105* (2013.01)
USPC ......... 709/217; 705/26.1; 705/27.1; 705/27.2

(58) Field of Classification Search
CPC . G06F 21/53; G06F 2221/2149; H04L 63/10; H04L 63/105
USPC ................. 709/217; 705/26.1, 26.41–26.64, 705/27.1–27.2
See application file for complete search history.

(56) References Cited

U.S. PATENT DOCUMENTS

| 7,620,653 | B1 * | 11/2009 | Swartz .................................. 1/1 |
| 2002/0046240 | A1 * | 4/2002 | Graham et al. ............... 709/203 |
| 2002/0165936 | A1 * | 11/2002 | Alston et al. .................. 709/217 |
| 2007/0266373 | A1 * | 11/2007 | Liu ................................ 717/126 |
| 2009/0126002 | A1 * | 5/2009 | Vail et al. .......................... 726/12 |
| 2011/0055900 | A1 * | 3/2011 | Chua et al. ......................... 726/4 |
| 2011/0087560 | A1 * | 4/2011 | West ............................ 705/27.1 |
| 2011/0106608 | A1 * | 5/2011 | Rothberg ................... 705/14.26 |
| 2011/0246294 | A1 * | 10/2011 | Robb et al. ................. 705/14.52 |
| 2012/0066586 | A1 * | 3/2012 | Shemesh ....................... 715/235 |
| 2012/0131045 | A1 * | 5/2012 | Ullmann et al. .............. 707/769 |
| 2013/0055252 | A1 * | 2/2013 | Lagar-Cavilla et al. .......... 718/1 |

OTHER PUBLICATIONS

U.S. Appl. No. 13/363,761 entitled "Multipart Encoding in Data Aggregation for Network Page Generation," filed Feb. 1, 2012.
U.S. Appl. No. 13/363,770 entitled "Loading Customer-Supplied Network Page Generation Code," filed Feb. 1, 2012.
U.S. Appl. No. 13/363,782 entitled "Error Handling in a Network Page Generation Environment," filed Feb. 1, 2012.
U.S. Appl. No. 13/363,787 entitled "Data Contracts for Network Page Generation Code," filed Feb. 1, 2012.
U.S. Appl. No. 13/363,816 entitled "Network Site Hosting in a Managed Environment," filed Feb. 1, 2012.

(Continued)

*Primary Examiner* — Brian J Gillis
*Assistant Examiner* — Shean Tokuta
(74) *Attorney, Agent, or Firm* — Thomas Horstemeyer, LLP (57) ABSTRACT

Disclosed are various embodiments for generating network pages using customer-supplied page generation code. A network page request is obtained from a client. The network page is associated with a network site hosted by a hosting provider on behalf of a customer. Customer data is aggregated from multiple data sources. Customer-supplied page generation code is executed to generate the network page. The page generation code may access the customer data through predefined variables, but the page generation code is restricted from accessing the data sources directly. The network page is sent to the client in response to the request.

22 Claims, 7 Drawing Sheets

(56) References Cited

OTHER PUBLICATIONS

U.S. Appl. No. 13/348,059 entitled "Generating Network Page Using Customer-Generated Network Page Portions," filed Jan. 11, 2012.
U.S. Appl. No. 13/348,069 entitled "Securing Execution of Customer-Supplied Network Page Generation Code," filed Jan. 11, 2012.
U.S. Appl. No. 13/348,081 entitled "Virtual File System for Hosted Network Sites," filed Jan. 11, 2012.
U.S. Appl. No. 13/348,088 entitled "Facilitating Access to Data in Network Page Generation Code," filed Jan. 11, 2012.
U.S. Appl. No. 13/347,953 entitled "Opportunistic Unloading of Network Applications," filed Jan. 11, 2012.

\* cited by examiner

GENERATING NETWORK PAGES USING CUSTOMER-SUPPLIED GENERATION CODE

CROSS REFERENCE TO RELATED APPLICATIONS

The following application is related to co-pending U.S. Patent Application entitled "GENERATING NETWORK PAGES USING CUSTOMER-GENERATED NETWORK PAGE PORTIONS" filed on even date herewith having application Ser. No. 13/348,059, which is incorporated herein by reference in its entirety.

BACKGROUND

Compliance with Payment Card Industry Data Security Standards (PCI DSS) and/or other security standards may present challenges for online merchants. For this and other reasons, online merchants may elect to have their electronic commerce platform managed by a third-party electronic commerce hosting provider who ensures compliance with the security standards. However, merchants may lose flexibility in customizing or configuring their network sites when using such a hosted solution as compared with a self-managed solution.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to generation of network pages with a hosted network page server platform. Merchants and other owners of network page sites may contract with hosting providers to generate and serve up their network sites. For example, a hosting provider may offer an end-to-end hosted electronic commerce platform that maintains an item catalog, generates detail pages for items, facilitates searching for items, facilitates browsing for items by way of a taxonomy or by way of suggested items, allows for customer reviews of items, and so on. Such a hosted electronic commerce platform may include functionality relating to shopping carts, order placement, order management and fulfillment, and/or other functionality. Such a platform offers merchants many advantages over self-managed solutions.

Merchants may wish to retain stylistic and content control over their online presence, even if it leverages an end-to-end hosted electronic platform. However, the hosting provider may be reluctant to grant the merchant access to execute arbitrary page generation code due to security concerns and compliance requirements for Payment Card Industry Data Security Standards (PCI DSS) and/or other security standards. Various embodiments of the present disclosure facilitate customer control over network page generation with a hosted network site. As used herein, the term "customer" may also include developers acting on behalf of customers of the hosting provider.

In a first embodiment, a merchant or other customer of the hosting provider is able to upload page generation code for execution server-side. Data aggregation is performed on behalf of the page generation code so that the page generation code does not contact data sources directly. In a second embodiment, a merchant or other customer of the hosting provider self-generates portions of network pages. These page portions are incorporated in network pages generated by systems operated by the hosting provider. In the following discussion, a general description of the system and its components is provided, followed by a discussion of the operation of the same.

Figure 1A:
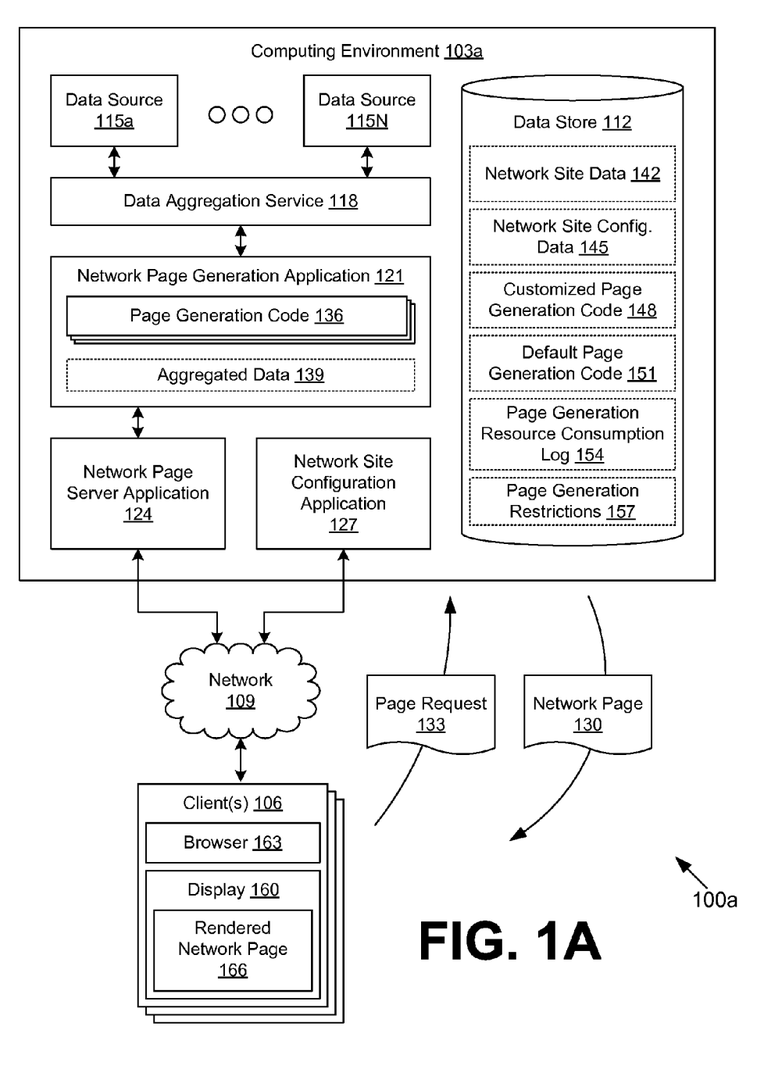
FIGS. 1A-1C are drawings of networked environments according to various embodiments of the present disclosure.

With reference to FIG. 1A, shown is a networked environment 100a according to a first embodiment relating to customer-supplied page generation code. The networked environment 100a includes a computing environment 103a in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103a may comprise, for example, a server computer or any other system providing computing capability. Alternatively, a plurality of computing devices may be employed that are arranged, for example, in one or more server banks or computer banks or other arrangements. For example, a plurality of computing devices together may comprise a cloud computing resource, a grid computing resource, and/or any other distributed computing arrangement. Such computing devices may be located in a single installation or may be distributed among many different geographical locations. The computing environment 103a may be operated by a hosting provider to host network sites for various customers.

Various applications and/or other functionality may be executed in the computing environment 103a according to various embodiments. Also, various data is stored in a data store 112 that is accessible to the computing environment 103a. The data store 112 may be representative of a plurality of data stores 112 as can be appreciated. The data stored in the data store 112, for example, is associated with the operation of the various applications and/or functional entities described below.

The components executed by the computing environment 103a, for example, include a plurality of data sources 115a . . . 115N, a data aggregation service 118, a network page generation application 121, a network page server application 124, a network site configuration application 127, and other applications, services, processes, systems, engines, or functionality not discussed in detail herein. The data sources 115 are executed to provide various data used in generating network pages 130 for network sites of customers of the hosting provider. Where the customers are merchants, the data provided by the data sources 115 may relate to electronic commerce data such as, for example, item catalog data, item suggestions data, shopping cart data, checkout data, order data, and so on. In one embodiment, the data sources 115 may comprise web services. In another embodiment, the data sources 115 may comprise files or other forms of data stores.

The data aggregation service 118 is executed to aggregate data from the data sources 115 for use in generation of network pages 130. The data aggregation service 118 may employ parallel fetching to reduce latency when data is aggregated from multiple data sources 115. The network page generation application 121 is executed to generate the network pages 130 in response to page requests 133 obtained from clients 106. The network pages 130 may correspond to web pages, gopher pages, mobile application screens, and/or other forms of network content. Where the customer is a merchant, the network pages 130 may correspond to home pages, catalog pages, item detail pages, shopping cart pages, checkout pages, order confirmation pages, and so on. Such network pages 130 may facilitate selecting items for purchase, rental, download, lease, or other form of consumption. In addition, where the customer is a merchant, the network page generation application 121 may include, or be in communication with, an electronic commerce system that performs various backend functions in order to facilitate the online purchase of items.

The network page generation application 121 may execute page generation code 136 in order to generate the network pages 130. The page generation code 136 may correspond to a default version supplied by the hosting provider or may correspond to a customized version supplied by the customer. In some cases, the page generation code 136 may be transformed or compiled from one code format to another and/or may be interpreted. As a non-limiting example, the page generation code 136 may correspond to JavaServer Pages (JSPs), which may be compiled into Java® servlets, which in turn may be compiled into bytecode which may be executable by the network page generation application 121. To this end, the network page generation application 121 may include a servlet container such as Apache® Tomcat® or another servlet container.

The network page generation application 121 may be configured to obtain aggregated data 139 from the data aggregation service 118 and to provide the aggregated data 139 to the page generation code 136, for example, as a set of predefined variables or by another approach. The network page generation application 121 may act as a "sandbox" for the page generation code 136 to enforce restrictions on application programming interface (API) calls, access to the data source 115, and/or other resources in the computing environment 103*a*.

The network page server application 124 is configured to obtain the page requests 133 from the client 106 over the network 109, to generate network pages 130 in response to the page requests 133 using the network page generation application 121, and to return the network pages 130 to the client 106 by way of the network 109. The network page server application 124 may correspond to a commercially available hypertext transfer protocol (HTTP) server such as, for example, Apache® HTTP Server, Apache® Tomcat®, Microsoft® Internet Information Services (IIS), and/or other servers.

The network site configuration application 127 is executed to facilitate customer configuration of network sites. To this end, the network site configuration application 127 may enable uploading and configuration of the page generation code 136, configuration of various parameters associated with the operation of the network site, order fulfillment management, item catalog management, and/or other functionality. The network site configuration application 127 may implement an HTTP server, a web-based distributed authoring and versioning (WebDAV) server, a file transfer protocol (FTP) server, and/or other servers.

The data stored in the data store 112 includes, for example, network site data 142, network site configuration data 145, customized page generation code 148, default page generation code 151, a page generation resource consumption log 154, page generation restrictions 157, and potentially other data. The network site data 142 corresponds to data used in the generation of the network pages 130 for the hosted network sites of the merchants or other customers. Such data may include, for example, templates, hypertext markup language (HTML), text, extensible markup language (XML), cascading style sheets (CSS), images, audio, video, animations, and/or other data.

The network site configuration data 145 may store parameters and/or other data for controlling the operation and appearance of the hosted network site. Such data may control various electronic commerce functionality such as, for example, item catalogs, item taxonomies, item searching, item recommendations, shopping carts, checkout, order fulfillment, and/or other functionality. The customized page generation code 148 corresponds to page generation code 136 which is created or customized by merchants or other customers. The default page generation code 151 may correspond to a default set of page generation code 136 for a merchant or other customer to use for a base functionality for a network site. The default page generation code 151 may generate network pages 130 having, for example, a default appearance and behavior for a generic electronic commerce site.

The page generation resource consumption log 154 may indicate the computing resources consumed by the page generation code 136 and/or the network page generation application 121 in generating network pages 130 for customer network sites. The page generation restrictions 157 may configure various restrictions to be placed on the page generation code 136 by the network page generation application 121. As a non-limiting example, where the page generation code 136 corresponds to JSP code, the network page generation application 121 may restrict the JSP code from including scriptlets and/or various API calls. Various functionality may be whitelisted or blacklisted, as the case may be. Such restrictions may be configured by way of parameters in the page generation restrictions 157.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 160. The display 160 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 163 and/or other applications. The browser 163 may be executed in a client 106, for example, to access and render network pages 130 served up by the computing environment 103a and/or other servers, thereby generating a rendered network page 166 on the display 160. The client 106 may be configured to execute applications beyond the browser 163 such as, for example, code development applications, file transfer applications, mobile applications, email applications, instant message applications, and/or other applications.

Next, a general description of the operation of the various components of the networked environment 100a is provided. To begin, a merchant or other customer of a hosting provider associated with the computing environment 103a configures a network site to be hosted through the computing environment 103a. The network site may have a common domain that is shared by multiple customers of the hosting provider, or the network site may correspond to a unique domain for each customer. The merchant or other customer may adopt default page generation code 151 for various network pages 130 accessible through the network site. Alternatively, or additionally, the merchant or other customer may create customized page generation code 148 for generating some or all of the network pages 130 accessible through the network site.

The merchant or other customer may interact with the network site configuration application 127 to customize or make changes to the network site. In various cases, the customer may edit the page generation code 136 directly through the network site configuration application 127, or the customer may upload replacement page generation code 136. Through this system, customers are able to control generation of network pages 130 for their network sites, despite using a hosted infrastructure and potentially a hosted electronic commerce platform.

The page generation code 136 is able to access the aggregated data 139 generated by the data aggregation service 118. In some cases, the page generation code 136 may declare various data that it accesses, which is then aggregated by the data aggregation service 118. In other cases, the data aggregation service 118 may provide a standard set of data from the data sources 115. The set of data may depend on the type of network page 130, e.g., whether the network page 130 is a checkout page, catalog page, order confirmation page, and so on. In one example, the aggregated data 139 may be associated with the hosted electronic commerce platform provided by the hosting provider. The aggregated data 139 may be provided to the page generation code 136 by way of variables such as implicit variables or other variables that are available in the scope of the page generation code 136. The page generation code 136 may be configured to use all of the predefined variables or a subset of the predefined variables. The page generation code 136 may be restricted from accessing the data sources 115 directly.

In operation, the client 106 sends a page request 133 to the network page server application 124 for some network page 130 from a network site of a customer. The network site is hosted on behalf of the customer by the hosting provider who operates the computing environment 103a. Where the customer is a merchant, the hosting provider may operate a hosted electronic commerce platform in conjunction with the computing environment 103a. The page request 133 is provided to the network page generation application 121, which then obtains the aggregated data 139 from the data aggregation service 118. The aggregation may be performed automatically in response to the page request 133 or in advance of the page request 133. The data aggregation service 118 fetches the aggregated data 139 from one or more data sources 115.

The page generation code 136 for the requested network page 130 is executed by the network page generation application 121. The network page generation application 121 facilitates access to the aggregated data 139 by the page generation code 136. The page generation code 136 generates the network page 130, and the network page server application 124 serves up the network page 130 to the client 106 in response to the page request 133.

In some embodiments, the page generation code 136 is restricted from accessing one or more of the data sources 115. The customer-supplied page generation code 136 may be isolated from one or more of the data sources 115 for purposes of complying with PCI DSS and/or other security standards. Consequently, the data from the data sources 115 may be accessible only as aggregated data 139 provided by the data aggregation service 118. It is noted that the data aggregation service 118 may generate the aggregated data 139 in response to the page request 133, in response to other events, or at other times as desired.

The page generation code 136 may be analyzed for compliance with one or more policies according to the page generation restrictions 157 when initially configured or compiled and/or at runtime. Such policies may include acceptable content of the network page 130, API usage, usage of scriptlets or other disallowed language features, and so on. If the page generation code 136 is determined to be non-compliant, the page generation code 136 may be unexecuted, terminated if already executing, replaced with default page generation code 151, or another action may be taken.

In one embodiment, the page generation code 136 may be executed in an elastic computing resource, which can expand and contract with respect to computing capacity in response to demand for the capacity by the page generation code 136. Such usage may be monitored or metered for billing and/or other purposes. To this end, the elastic computing resource usage may be recorded in the page generation resource consumption log 154. This recognizes that page generation code 136 for some customers may be more computing resource intensive than page generation code 136 for other customers. Accordingly, an elastic amount of resources may be provided such that the customer is billed for what is used in terms of machine instances, memory, processor time, disk space, and/or other resources that are allocated for the customer.

Figure 1B:
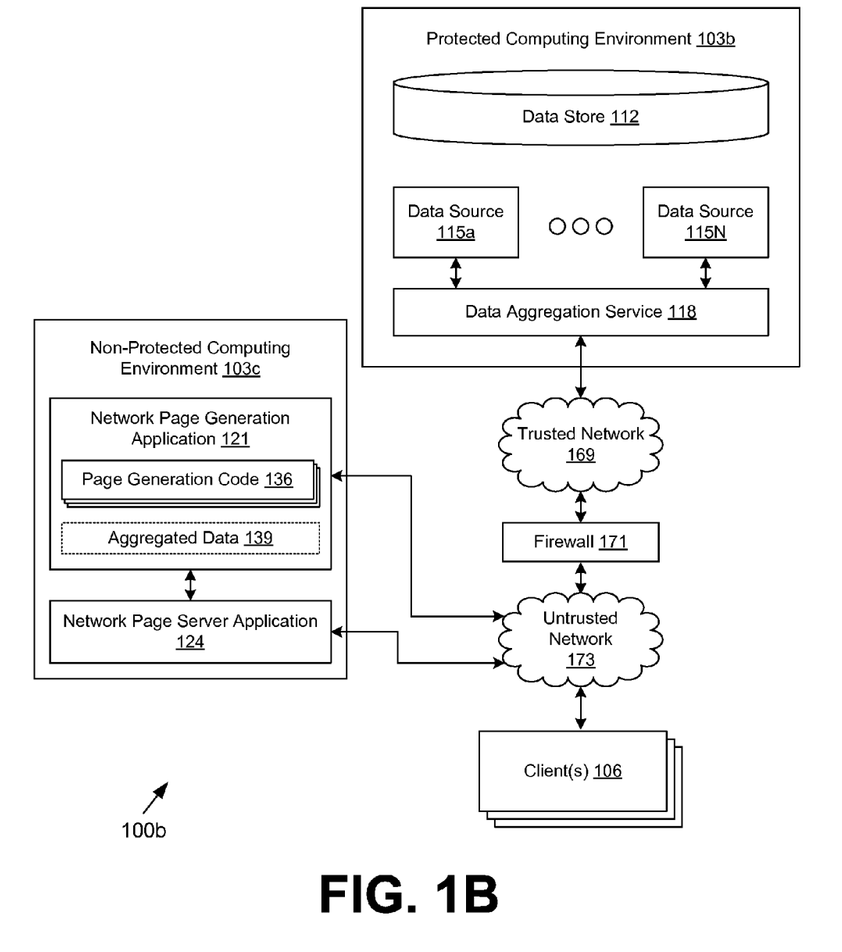

Referring next to FIG. 1B, shown is a networked environment 100b according to another embodiment relating to customer-supplied page generation code. The networked environment 100b includes a protected computing environment 103b in communication with a non-protected computing environment 103c and one or more clients 106 by way of a trusted network 169, a firewall 171, and an untrusted network 173. The trusted network 169 and the untrusted network 173 each include, for example, the Internet, intranets, extranets, wide area networks (WANs), local area networks (LANs), wired networks, wireless networks, or other suitable networks, etc., or any combination of two or more such networks. Network traffic between the untrusted network 173 and the trusted network 169 passes through the firewall 171. The firewall 171 may perform network address translation (NAT), packet filtering, and/or other functions, which may serve to logically separate the trusted network 169 from the untrusted network 173 in accordance with network security policies.

In contrast to the networked environment 100a (FIG. 1A), the computing environment 103a (FIG. 1A) has been separated into a protected computing environment 103b and a non-protected computing environment 103c to divide functionality. Such a division may be desirable for security reasons, PCI DSS compliance reasons, and/or other reasons. It may be the case that the protected computing environment 103b is under control of the hosting provider, while the customer may have at least some control over the non-protected computing environment 103c, at least to the extent that the customer is able to configure the page generation code 136. In other words, the customer may have a greater level of access to the non-protected computing environment 103c than to the protected computing environment 103b.

In the exemplary arrangement of FIG. 1B, the protected computing environment 103b includes the data store 112, the data sources 115, the data aggregation service 118, and potentially other data and applications. The non-protected computing environment 103c includes the network page generation application 121, the page generation code 136, the aggregated data 139, the network page server application 124, and potentially other data and applications. Such a separation may be employed to prevent direct access by the page generation code 136 to the data sources 115, the data store 112, an electronic commerce system, and/or other data and applications.

The data aggregation service 118 may control access to the customer data by way of network address access control whitelists, pre-shared symmetric keys, signed certificate validation, and/or other authentication approaches. In addition, data request methods may be restricted, e.g., HTTP "GET" may be permissible but HTTP "POST" or "PUT" may be impermissible. It may be the case that no external endpoints for the data sources 115 are exposed to the untrusted network 173, while an external endpoint for the data aggregation service 118 may be exposed to the untrusted network 173 for the network page generation application 121.

Figure 1C:
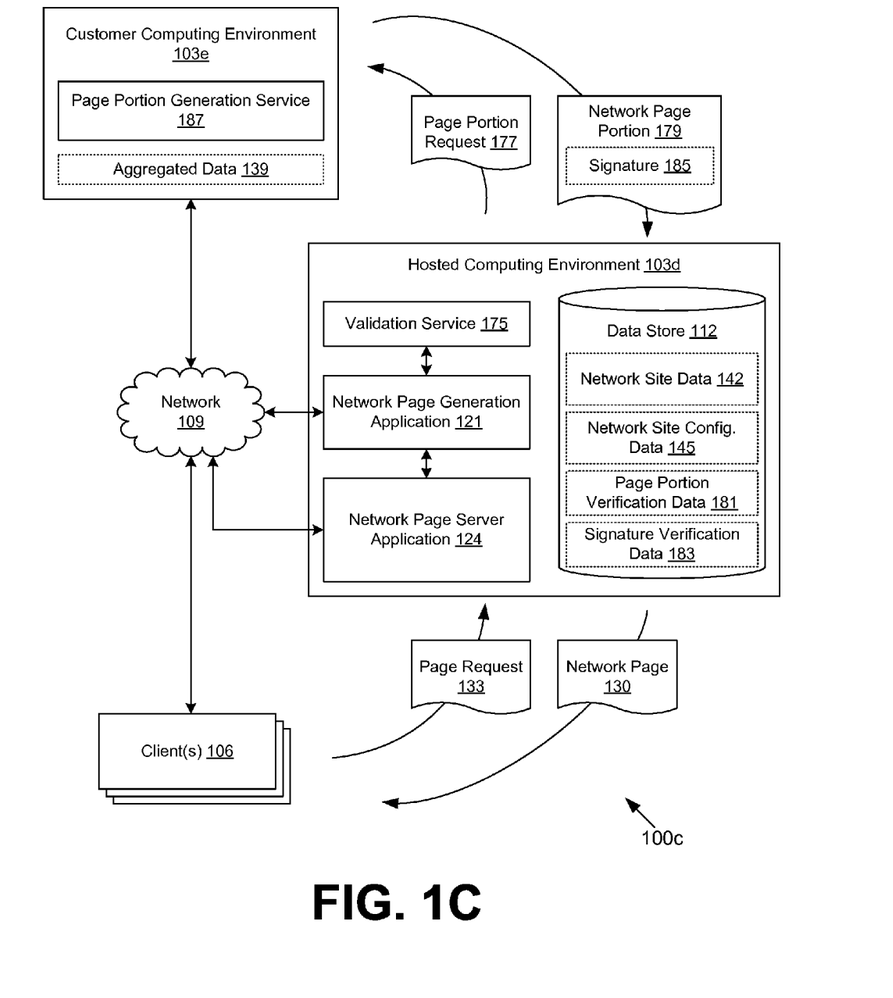

Moving on now to FIG. 1C, shown is a networked environment 100c corresponding to a second embodiment where portions of network pages are generated by customers and then incorporated in network pages generated under control of a hosting provider for network sites of the customers. The networked environment 100c may include a hosted computing environment 103d in data communication with a customer computing environment 103e and one or more clients 106 by way of a network 109.

The hosted computing environment 103d corresponds to computing resources provided by and under control of a hosting provider. The hosted computing environment 103d hosts network sites for customers such as merchants similarly to the computing environment 103a (FIG. 1A). The customer computing environment 103e corresponds to computing resources under control of the customer. The customer computing environment 103e may or may not be provided by the hosting provider. In one embodiment, the customer computing environment 103e corresponds to an elastic computing resource. The customer may have more flexibility in controlling aspects of the customer computing environment 103e versus the hosted computing environment 103d due to security compliance requirements such as PCI DSS. Additionally, the hosted computing environment 103d may correspond to shared infrastructure, whereas the customer computing environment 103e may correspond to dedicated infrastructure such as, for example, physical machines, virtual machines, and so on. In some cases, one or more firewalls in the network 109 may be interposed between the customer computing environment 103e and the hosted computing environment 103d.

The hosted computing environment 103d may comprise, for example, a server computer or any other system providing computing capability. Alternatively, a plurality of computing devices may be employed that are arranged, for example, in one or more server banks or computer banks or other arrangements. For example, a plurality of computing devices together may comprise a cloud computing resource, a grid computing resource, and/or any other distributed computing arrangement. Such computing devices may be located in a single installation or may be distributed among many different geographical locations.

Various applications and/or other functionality may be executed in the hosted computing environment 103d according to various embodiments. Also, various data is stored in a data store 112 that is accessible to the hosted computing environment 103d. The data store 112 may be representative of a plurality of data stores 112 as can be appreciated. The data stored in the data store 112, for example, is associated with the operation of the various applications and/or functional entities described below.

The components executed by the hosted computing environment 103d, for example, include a network page generation application 121, a network page server application 124, a validation service 175, a network site configuration application 127 (FIG. 1A), and other applications, services, processes, systems, engines, or functionality not discussed in detail herein. The network page generation application 121 is executed to generate network pages 130 for network sites of customers in response to page requests 133 obtained from clients 106. In contrast to FIG. 1A, the network page generation application 121 in FIG. 1C does not execute customer-supplied page generation code 136 (FIG. 1A).

In this embodiment, the network page generation application 121 issues page portion requests 177 to the customer computing environment 103e and obtains network page portions 179 from the customer computing environment 103e in response. The network page portions 179 are validated and included in the network page 130 if valid. The network page server application 124 may operate as described in connection with FIG. 1A. The validation service 175 is executed to validate and/or verify the compliance of the network page portions 179 with one or more policies.

The data stored in the data store 112 includes, for example, network site data 142 and network site configuration data 145 as described in connection with FIG. 1A, as well as page portion verification data 181, signature verification data 183, and potentially other data. The page portion verification data 181 includes data employed by the validation service 175 to verify or validate the compliance of network page portions 179 with one or more policies. For example, the page portion verification data 181 may include whitelists and/or blacklists for elements that may or may not be included in the network page portions 179. The page portion verification data 181 may also include data used to authenticate the customer computing environment 103e. The signature verification data 183 may include data used to verify signatures 185 returned with the network page portions 179. Such signatures 185 may be of a cryptographic nature and may be used to authenticate the source of the network page portion 179 and/or indicate a previous validation assessment of the network page portion 179.

The customer computing environment 103e may comprise, for example, a server computer or any other system providing computing capability. Alternatively, a plurality of computing devices may be employed that are arranged, for example, in one or more server banks or computer banks or other arrangements. For example, a plurality of computing devices together may comprise a cloud computing resource, a grid computing resource, and/or any other distributed computing arrangement. Such computing devices may be located in a single installation or may be distributed among many different geographical locations.

Various applications and/or other functionality may be executed in the customer computing environment 103e according to various embodiments. Also, various data is stored in a data store that is accessible to the customer computing environment 103e. The data stored in the customer computing environment 103e includes, for example, aggregated data 139 and potentially other data. The components executed by the customer computing environment 103e, for example, include a page portion generation service 187 and other applications, services, processes, systems, engines, or functionality not discussed in detail herein. The page portion generation service 187 is executed to generate network page portions 179 in response to page portion requests 177. The network page portions 179 potentially may include signatures 185 for verification purposes. The aggregated data 139 may be used to generate the network page portions 179.

Next, a general description of the operation of the various components of the networked environment 100c is provided. To begin, a user at a client 106 sends a page request 133 to the network page server application 124 associated with a network site of a customer of a hosting provider. In response, the network page generation application 121 determines what network page portions 179 are to be included or incorporated in the network page 130 to be generated. The network page generation application 121 issues potentially multiple page portion requests 177 to potentially multiple page portion generation services 187. The page portion requests 177 may include data derived at least in part from the page requests 133 and/or other data.

The page portion generation services 187 then generate the network page portions 179, and may also generate signatures 185 for verification purposes. The network page portions 179 may include CSS, XML, HTML, extensible HTML (XHTML), and/or other types of code. The network page portions 179 may be generated dynamically based at least in part on information derived from the page requests 133. The network page portions 179 and signatures 185 are returned to the network page generation application 121.

The validation service 175 determines whether the network page portions 179 comply with one or more policies in order for the network page portions 179 to be included in the network page 130. To this end, the validation service 175 may perform a runtime check on the content of the network page portion 179. Where the network page portion 179 includes HTML or CSS, the validation service 175 may determine whether the network page portion 179 includes HTML or CSS elements that are permissible or impermissible according to the page portion verification data 181. In some cases, the validation service 175 may require compliance of the network page portion 179 with a restricted XML schema. JavaScript, VBScript, and other scripting languages may be impermissible within the network page portion 179.

Several non-limiting examples of HTML elements that may be impermissible include "BGSOUND," "SCRIPT," "STYLESHEET," "EVENT," "OBJECT," "APPLET," "META," "LINK," and others. Such elements may be impermissible due to the ability to import or include JavaScript or other impermissible executable code. An "IMG" element may be permissible to allow for the inclusion of images, but the "SRC" attribute of the "IMG" element may be examined to ensure that the attribute does not include embedded JavaScript or other impermissible executable code. Other elements may be similarly examined for impermissible executable code. CSS import rules may be impermissible due to an inability to examine what is imported. Unparseable CSS may be impermissible, as well as certain or unrecognized extension points and behaviors executed to style matched elements. CSS properties which are judged to be unsafe may also be impermissible.

The validation service 175 may also evaluate the content of the network page portion 179 to ensure compliance with established policies. For example, a policy may require a copyright notice on each network page 130. The validation service 175 may ensure that the copyright notice is included within at least one of the network page portions 179. Consequently, in some situations, validation may depend on a condition existing across multiple network page portions 179 to be included in a network page 130.

To improve latency, the validation procedure may be performed in advance. Advance validation may be used, for example, with network page portions 179 that are relatively static. For example, the page portion generation service 187 may call the validation service 175 and obtain a signature 185 if the network page portion 179 is valid. The signature 185 may be returned to the network page generation application 121 along with the network page portion 179. The validation service 175 may then verify whether the signature 185 is valid. In one scenario, the signature 185 may be configured such that any changes to the pre-validated network page portion 179 may render the signature 185 invalid.

When the network page portions 179 have been received, the network page generation application 121 assembles the network page portions 179 into the network page 130 along with potentially other content. If the network page portions 179 are invalid, they may not be included in the network page 130 or the network page 130 may not be generated. In some cases, an error may be returned to the client 106. Likewise, if the network page portions 179 are not received due to a timeout or other error, the network page 130 may be generated without the network page portions 179 or the network page 130 may not be generated. If the network page 130 is generated, the network page 130 is returned to the client 106 by the network page server application 124.

Figure 2:
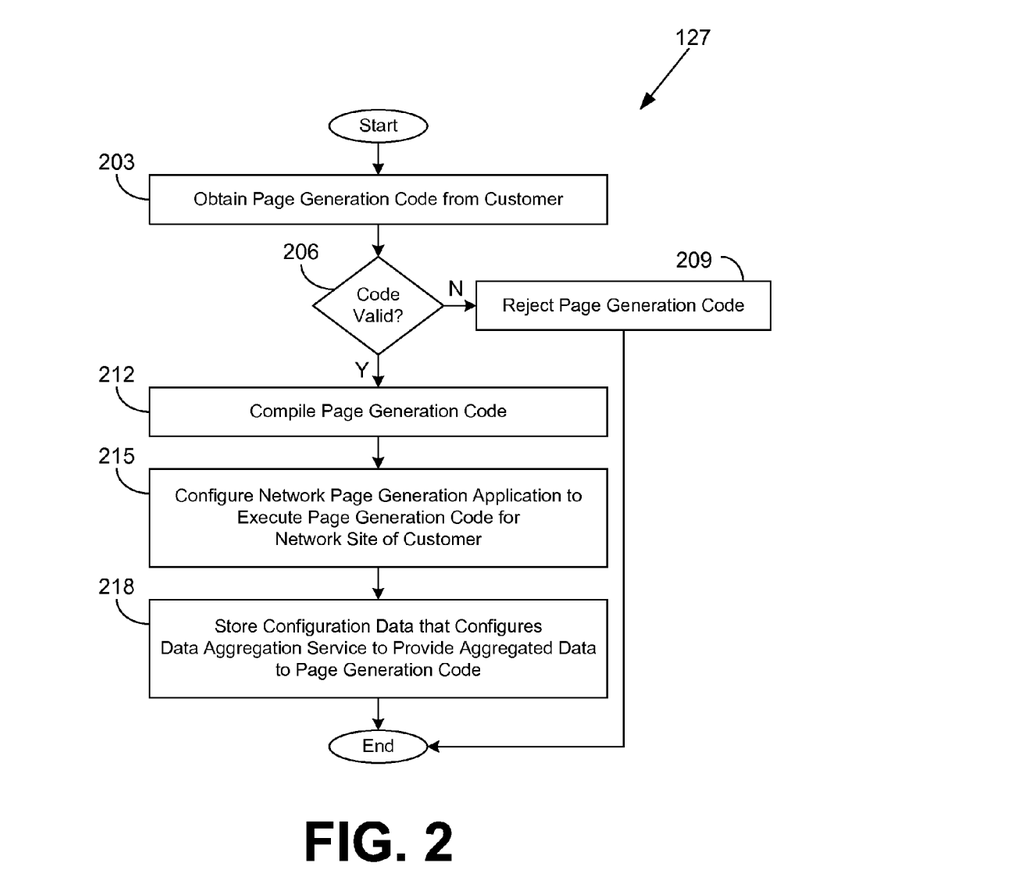
FIG. 2 is a flowchart illustrating one example of functionality implemented as portions of a network site configuration application executed in a computing environment in the networked environment of FIG. 1A according to one embodiment of the present disclosure.

Referring next to FIG. 2, shown is a flowchart that provides one example of the operation of a portion of the network site configuration application 127 according to the embodiments discussed in connection with FIG. 1A. It is understood that the flowchart of FIG. 2 provides merely an example of the many different types of functional arrangements that may be employed to implement the operation of the portion of the network site configuration application 127 as described herein. As an alternative, the flowchart of FIG. 2 may be viewed as depicting an example of steps of a method implemented in the computing environment 103a (FIG. 1A) according to one or more embodiments.

Beginning with box 203, the network site configuration application 127 obtains page generation code 136 (FIG. 1A) from a customer whose network site is hosted by the hosting provider who operates the computing environment 103a. The network site configuration application 127 may be configured to authenticate a client 106 (FIG. 1A) associated with the customer. In box 206, the network site configuration application 127 determines whether the page generation code 136 is valid. If the page generation code 136 is not valid, the network site configuration application 127 rejects the page generation code 136 in box 209. An error may be presented to the customer. Thereafter, the portion of the network site configuration application 127 ends.

If the page generation code 136 is valid, the network site configuration application 127 proceeds from box 206 to box 212. Even assuming that the page generation code 136 is determined to be valid by the network site configuration application 127, validity checks may still need to be performed by the network page generation application 121 (FIG. 1A) at runtime. In box 212, the network site configuration application 127 compiles the page generation code 136. For example, the network site configuration application 127 may compile the page generation code 136 from a JSP into a servlet. The resulting servlet code may also be compiled into bytecode for execution by a Java® Virtual Machine (JVM) or directly by a processor circuit of the computing environment 103a.

In box 215, the network site configuration application 127 configures the network page generation application 121 to execute the compiled page generation code 136 for one or more network pages 130 (FIG. 1A) for the network site of the customer. In box 218, the network site configuration application 127 may store configuration data that configures the data aggregation service 118 (FIG. 1A) to provide a set of aggregated data 139 (FIG. 1A) to the page generation code 136. Thereafter, the portion of the network site configuration application 127 ends.

Figure 3:
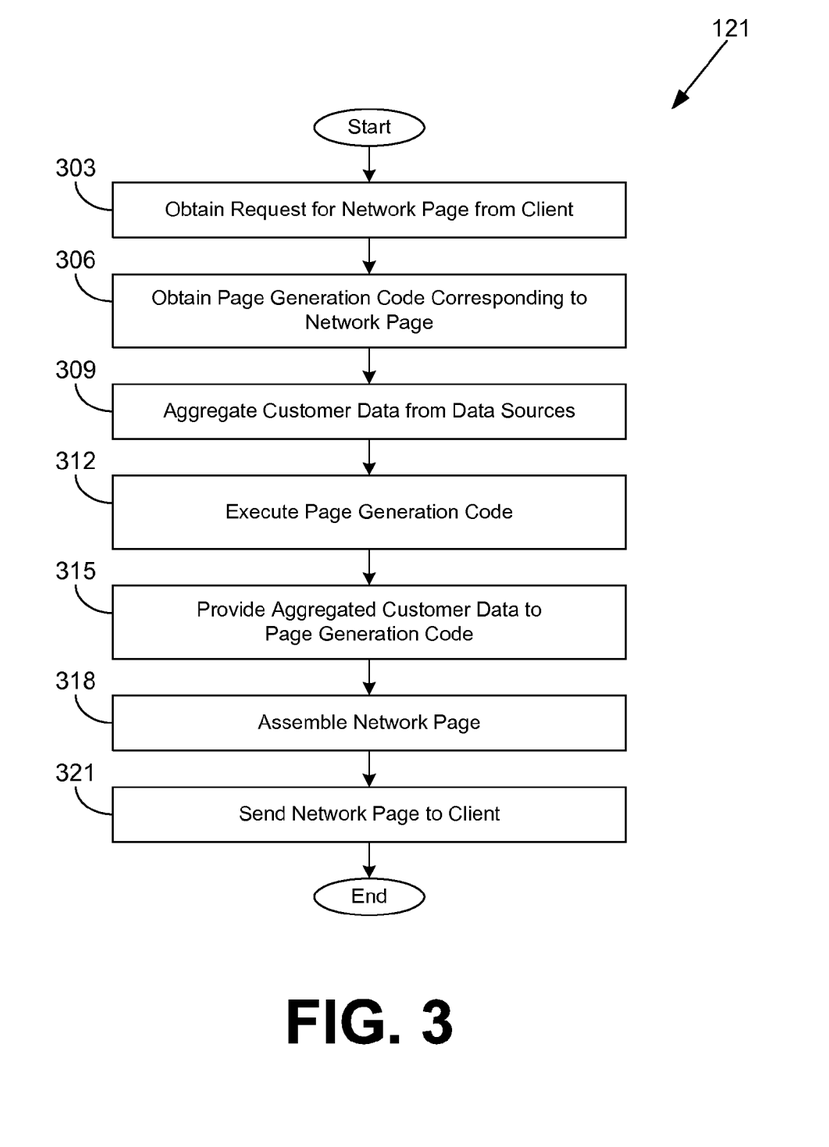
FIG. 3 is a flowchart illustrating one example of functionality implemented as portions of a network page generation application executed in a computing environment in the networked environment of FIG. 1A according to one embodiment of the present disclosure.

Continuing on to FIG. 3, shown is a flowchart that provides one example of the operation of a portion of the network page generation application 121 according to the embodiments discussed in connection with FIG. 1A. It is understood that the flowchart of FIG. 3 provides merely an example of the many different types of functional arrangements that may be employed to implement the operation of the portion of the network page generation application 121 as described herein. As an alternative, the flowchart of FIG. 3 may be viewed as depicting an example of steps of a method implemented in the computing environment 103a (FIG. 1A) according to one or more embodiments.

Beginning with box 303, the network page generation application 121 obtains a page request 133 (FIG. 1A) from the client 106 (FIG. 1A) by way of a network page server application 124 (FIG. 1A). The page request 133 indicates a network page 130 (FIG. 1A) from a network site of a customer. The network site is hosted by the hosting provider who operates the computing environment 103a. In box 306, the network page generation application 121 obtains or fetches page generation code 136 (FIG. 1A) corresponding to the requested network page 130. In box 309, the network page generation application 121 aggregates various data pertaining to the customer from one or more data sources 115 (FIG. 1A) by way of the data aggregation service 118 (FIG. 1A).

In box 312, the network page generation application 121 executes the page generation code 136. In doing so, the network page generation application 121 may perform various runtime checks to ensure that the page generation code 136 does not include any impermissible code or content. In box 315, the network page generation application 121 provides the aggregated data 139 (FIG. 1A) to the page generation code 136 as predefined implicit variables.

In box 318, the network page generation application 121 assembles the network page 130 using the output of the page generation code 136 and potentially other data. In box 321, the network page generation application 121 sends the generated network page 130 to the client 106 in response to the page request 133. Thereafter, the portion of the network page generation application 121 ends.

Figure 4:
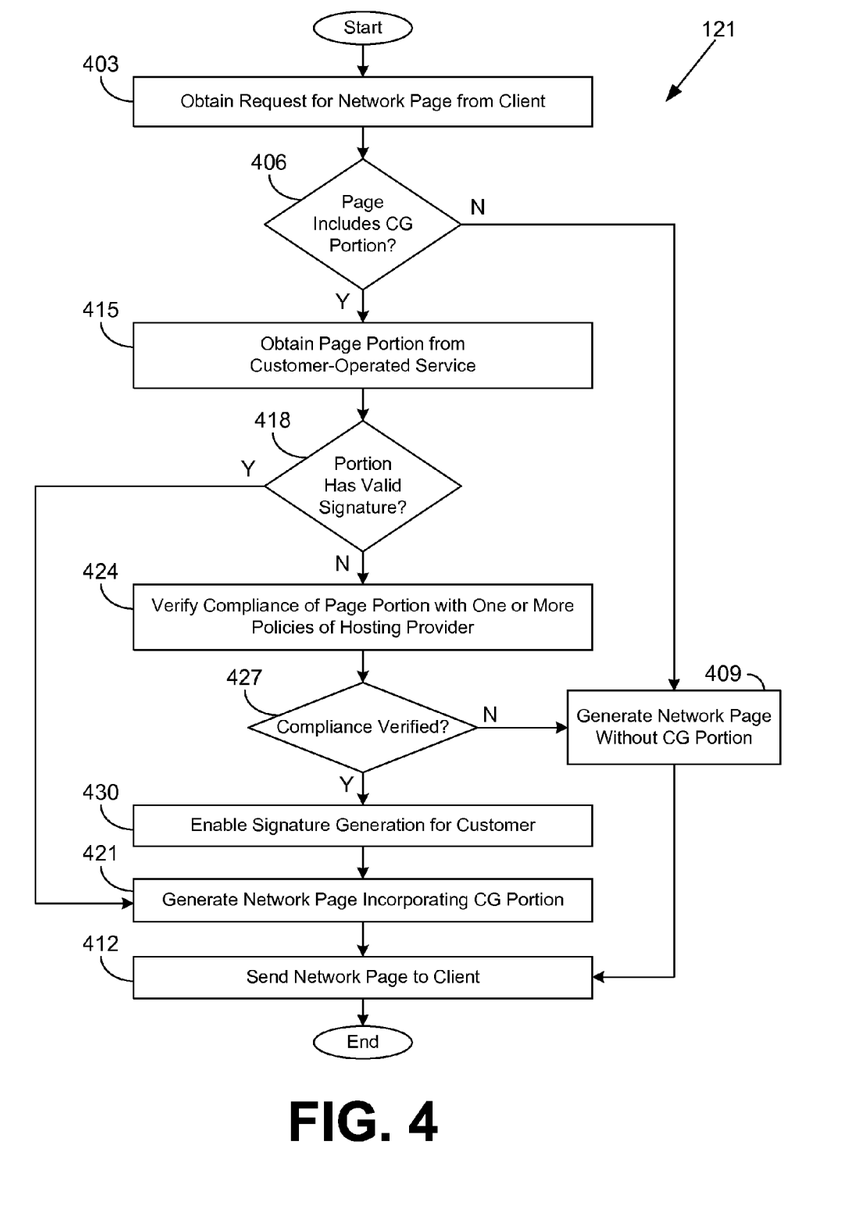
FIG. 4 is a flowchart illustrating one example of functionality implemented as portions of a network page generation application executed in a computing environment in the networked environment of FIG. 1C according to one embodiment of the present disclosure.

Turning now to FIG. 4, shown is a flowchart that provides one example of the operation of a portion of the network page generation application 121 according to the embodiments discussed in connection with FIG. 1C. It is understood that the flowchart of FIG. 4 provides merely an example of the many different types of functional arrangements that may be employed to implement the operation of the portion of the network page generation application 121 as described herein. As an alternative, the flowchart of FIG. 4 may be viewed as depicting an example of steps of a method implemented in the hosted computing environment 103d (FIG. 1C) according to one or more embodiments.

Beginning with box 403, the network page generation application 121 obtains a page request 133 (FIG. 1C) for a network page 130 (FIG. 1C) from a client 106 (FIG. 1C) by way of a network page server application 124 (FIG. 1C). The network page 130 is part of a network site of a customer which is hosted by the hosting provider who operates the hosted computing environment 103d. In box 406, the network page generation application 121 determines whether the requested network page 130 includes a customer-generated network page portion 179 (FIG. 1C).

If the requested network page 130 does not include a customer-generated network page portion 179, the network page generation application 121 moves to box 409 and generates the network page 130 without a customer-generated portion. In box 412, the network page generation application 121 sends the network page 130 to the client 106 by way of the network page server application 124. Thereafter, the portion of the network page generation application 121 ends.

If, instead, the network page generation application 121 determines that the requested network page 130 does include one or more customer-generated portions, the network page generation application 121 moves from box 406 to box 415. In box 415, the network page generation application 121 obtains a network page portion 179 from a page portion generation service 187 (FIG. 1C). To this end, the network page generation application 121 may authenticate the page portion generation service 187. In some cases, the network page generation application 121 may obtain multiple network page portions 179, potentially in parallel, from multiple page portion generation services 187. If the network page portion 179 cannot be obtained, due to a network timeout or other error, a network page 130 may be generated without the unobtained portion or an error may be generated.

In box 418, the network page generation application 121 determines whether the network page portion 179 has a valid signature 185 (FIG. 1C) by way of the validation service 175 (FIG. 1C). A valid signature 185 may indicate that a determination of validity has already been made for the network page portion 179. If the network page portion 179 has a valid signature 185, the network page generation application 121 moves to box 421 and generates the network page 130 including the customer-generated network page portion(s) 179. In box 412, the network page generation application 121 sends the network page 130 to the client 106 by way of the network page server application 124. Thereafter, the portion of the network page generation application 121 ends.

If, instead, it is determined that the network page portion 179 does not have a valid signature 185, the network page generation application 121 proceeds from box 418 to box 424. In box 424, the network page generation application 121 verifies the compliance of the network page portion 179 with one or more policies of the hosting provider by way of the validation service 175. In box 427, the network page generation application 121 determines whether compliance has been verified. If compliance has not been verified, the network page generation application 121 transitions from box 427 to box 409 and generates the network page 130 without the customer-generated portion. In box 412, the network page generation application 121 sends the network page 130 to the client 106 by way of the network page server application 124. Thereafter, the portion of the network page generation application 121 ends.

If compliance is verified, the network page generation application 121 instead moves from box 427 to box 430 and may enable signature 185 generation for the customer for the particular network page portion 179 by way of the validation service 175. The network page generation application 121 then moves to box 421 and generates the network page 130 including the customer-generated network page portion(s) 179. In box 412, the network page generation application 121 sends the network page 130 to the client 106 by way of the network page server application 124. Thereafter, the portion of the network page generation application 121 ends.

Figure 5:
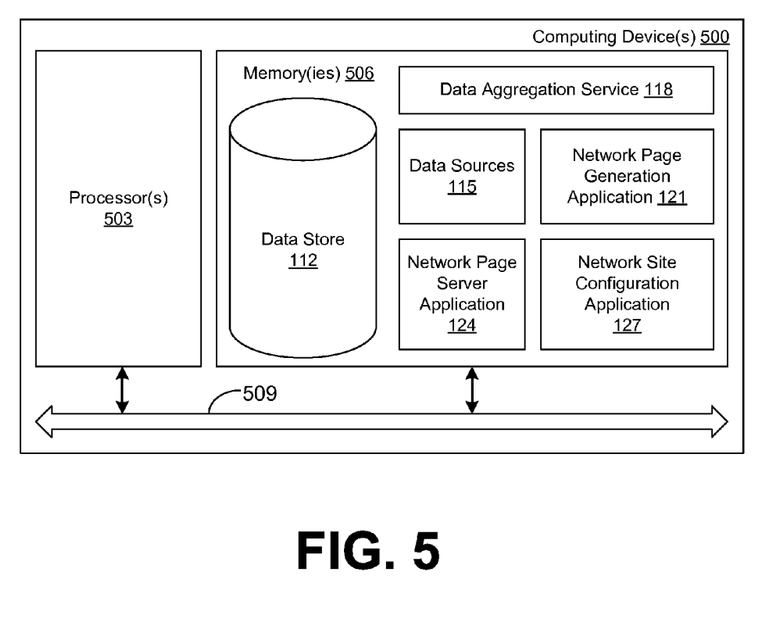
FIG. 5 is a schematic block diagram that provides one example illustration of a computing device employed in the computing environment in the networked environment of FIG. 1A according to various embodiments of the present disclosure.

With reference to FIG. 5, shown is a schematic block diagram of the computing device 500 according to an embodiment of the present disclosure. The computing device 500 corresponds to a representative computing device which may be employed in the computing environment 103a (FIG. 1A), the protected computing environment 103b (FIG. 1B), the non-protected computing environment 103c (FIG. 1B), the hosted computing environment 103d (FIG. 1C), or the customer computing environment 103e (FIG. 1C).

The computing device 500 includes at least one processor circuit, for example, having a processor 503 and a memory 506, both of which are coupled to a local interface 509. To this end, the computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the data aggregation service 118, the data sources 115, the network page generation application 121, the network page server application 124, the network site configuration application 127, and potentially other applications such as the page portion generation service 187 (FIG. 1C) and the validation service 175 (FIG. 1C). Also stored in the memory 506 may be a data store 112 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the data aggregation service 118, the data sources 115, the network page generation application 121, the network page server application 124, the network site configuration application 127, the page portion generation service 187, the validation service 175, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2-4 show the functionality and operation of an implementation of portions of the network site configuration application 127 and the network page generation application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 2-4 show a specific order of execution, it is understood that the order of execution may differ from that which is depicted. For example, the order of execution of two or more blocks may be scrambled relative to the order shown. Also, two or more blocks shown in succession in FIGS. 2-4 may be executed concurrently or with partial concurrence. Further, in some embodiments, one or more of the blocks shown in FIGS. 2-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the data aggregation service 118, the data sources 115, the network page generation application 121, the network page server application 124, the network site configuration application 127, the page portion generation service 187, and the validation service 175, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
   code that aggregates electronic commerce data associated with a hosted electronic commerce platform from a plurality of data sources, the hosted electronic commerce platform provided by a hosting provider for a merchant;
   code that transforms page generation code received from the merchant from a first code format into a second code format;
   code that, in response to receiving a request for a network page from a client, executes the page generation code to generate the network page in response to the request, wherein the network page is associated with a network site hosted by the hosting provider on behalf of the merchant, the code that executes is configured to facilitate access by the page generation code to the electronic commerce data as a plurality of predefined variables, the page generation code is restricted from accessing the data sources directly, and the page generation code is configured to use a subset of the predefined variables;
   code that terminates execution of the page generation code responsive to detecting that the page generation code attempts to access the data sources directly; and
   and code that sends the network page to the client in response to the request.

2. The non-transitory computer-readable medium of claim 1, wherein the first code format corresponds to a JavaServer Page, and the second code format corresponds to a Java servlet.

3. A system, comprising:
   at least one computing device; and
   at least one application executable in the at least one computing device, the at least one application comprising:
   logic that that aggregates customer data from a plurality of data sources;
   logic that, in response to receiving a request for a network page from a client, executes page generation code supplied by the customer to generate the network page in response to the request, wherein the network page is associated with a network site hosted by a hosting provider on behalf of a customer, the logic that executes is configured to facilitate access by the page generation code to the customer data as a plurality of predefined variables, and the page generation code is restricted from accessing the data sources directly;
   logic that terminates execution of the page generation code responsive to detecting that the page generation code attempts to access the data sources directly; and
   logic that sends the network page to the client in response to the request.

4. The system of claim 3, wherein the page generation code corresponds to JavaServer Page code.

5. The system of claim 3, wherein the at least one application further comprises:
   logic that, in response to receiving the page generation code from the customer, compiles the page generation code into another code format.

6. The system of claim 5, wherein the other code format corresponds to servlet code, and the logic that executes corresponds to a servlet container.

7. The system of claim 3, wherein the customer is a merchant, the hosting provider provides a hosted electronic commerce platform for the network site of the merchant, and the customer data relates to an interaction of the client with the hosted electronic commerce platform.

8. The system of claim 7, wherein the customer data includes at least one of shopping cart data or catalog item data.

9. The system of claim 3, wherein the logic that aggregates is executed in a first subset of the at least one computing device corresponding to a protected computing environment managed by the hosting provider, and the logic that executes is executed in a second subset of the at least one computing device corresponding to a non-protected computing environment.

10. The system of claim 9, wherein the hosting provider restricts access by the customer to the protected computing environment in order to comply with at least one Payment Card Industry Data Security Standard (PCI DSS).

11. The system of claim 9, wherein the protected computing environment is protected from the non-protected computing environment by way of a firewall.

12. The system of claim 9, wherein the non-protected computing environment is managed at least in part by the customer.

13. The system of claim 9, wherein the customer has a greater level of access to the non-protected computing environment than to the protected computing environment.

14. The system of claim 3, wherein the logic that aggregates is configured to aggregate the customer data in response to the request.

15. The system of claim 3, wherein the logic that aggregates is configured to aggregate the customer data in advance of the request.

16. The system of claim 3, wherein the logic that executes is executed by a subset of the at least one computing device corresponding to an elastic computing resource.

17. The system of claim 16, wherein the at least one application further comprises logic that meters computing capacity utilized by the page generation code in the elastic computing resource.

18. A method, comprising:
receiving, via at least one of the one or more computing devices, a request for a network page from a client the network page being associated with a network site hosted by a hosting provider on behalf of a customer;
receiving, via at least one of the one or more computing devices, page generation code from the customer;
transforming, via at least one of the one or more computing devices the page generation code from a first code format in to a second code format;
executing, via at least one of the one or more computing devices, the page generation code to generate the network page;
automatically aggregating, via at least one of the one or more computing devices, customer data from a plurality of data sources;
providing, via at least one of the one or more computing devices, the customer data to the page generation code as a plurality of predefined variables, wherein the page generation code is configured to use a subset of the predefined variables;
terminating execution of the gage generation code responsive to detecting that the gage generation code attempts to access the data sources directly;
and sending, via at least one of the one or more computing devise, the network page to the client in response to the request.

19. The method of claim 18, wherein the page generation code is executed in an elastic computing resource, and the method further comprises determining, via at least one of the one or more computing devices, a quantity of computing resources consumed by the page generation code.

20. The method of claim 18, wherein the aggregating is performed in a first subset of the one or more computing devices corresponding to a protected computing environment managed by the hosting provider, and the executing is performed in a second subset of the one or more computing devices corresponding to a non-protected computing environment.

21. The method of claim 18, wherein the page generation code is restricted from accessing the data sources directly, and the method further comprises terminating, via at least one of the one or more computing devices, execution of the page generation code responsive to detecting that the page generation code attempts to access the data sources directly.

22. The method of claim 18, wherein the page generation code is restricted from making at least one application programming interface (API) call.

* * * * *

UNITED STATES PATENT AND TRADEMARK OFFICE
CERTIFICATE OF CORRECTION

| | | |
|---|---|---|
| PATENT NO. | : 8,775,559 B1 | Page 1 of 1 |
| APPLICATION NO. | : 13/348051 | |
| DATED | : July 8, 2014 | |
| INVENTOR(S) | : Huntwork et al. | |

It is certified that error appears in the above-identified patent and that said Letters Patent is hereby corrected as shown below:

In the Claims

At column 17; line 38, delete "via at least one of the one or more computing devices" and replace with -- via at least one of one or more computing devices --

At column 18; line 19, delete "via at least one of the one or more computing devise" and replace with -- via at least one of the one or more computing devices --

Signed and Sealed this
Seventeenth Day of March, 2015

Michelle K. Lee
*Director of the United States Patent and Trademark Office*